United States Patent [19]

Bernstein et al.

[11] 4,404,295
[45] Sep. 13, 1983

[54] POLYESTER RESINS FOR POLYURETHANE FOAMS

[75] Inventors: Carl Bernstein, Deerfield; James Stogis, Joliet; Travis Riddle, Justice; Robert Kufrin, Chicago, all of Ill.

[73] Assignee: Witco Chemical Corporation, Del.

[21] Appl. No.: 398,459

[22] Filed: Jul. 14, 1982

Related U.S. Application Data

[62] Division of Ser. No. 263,224, May 13, 1981, Pat. No. 4,349,662.

[51] Int. Cl.³ ............................................. C08G 18/14
[52] U.S. Cl. .................................... 521/172; 521/173
[58] Field of Search ................................ 521/173, 172

[56] References Cited

U.S. PATENT DOCUMENTS 3,079,350  2/1963  Bernstein ........................... 521/172
3,298,974  1/1967  Bernstein et al. ................... 521/172
3,399,154  8/1968  Bernstein et al. ................... 521/172
3,769,245 10/1973  Stewart et al. ..................... 521/157

Primary Examiner—Maurice J. Welsh
Attorney, Agent, or Firm—Wallenstein, Wagner, Hattis, Strampel & Aubel

[57] ABSTRACT

The machine processing character as well as the stress-strain properties of polyester polyurethane foam are improved by the use of a cross-linking polyol, a viscosity increasing dicarboxylic acid or anhydride such as phthalic anhydride, and by the use of specific minor amounts of poly(oxyethylene) glycol, in the esterification formula of foam grade polyester resins. A nonhydrophillic flexible polyester based polyurethane foam is produced.

5 Claims, No Drawings

POLYESTER RESINS FOR POLYURETHANE FOAMS

This is a divisional application of U.S. Ser. No. 263,224, filed May 13, 1981, issued as U.S. Pat. No. 4,349,662 on Sept. 14, 1982.

FIELD OF THE INVENTION

This invention relates to improvements in flexible polyester bases polyurethane foams. Specifically, this invention relates to improvements in a number of physical properties in polyester based polyurethane foams and in the polyester resin formulation for making the foam.

BACKGROUND AND DISCUSSION OF PRIOR ART

Polyester based flexible polyurethane foams, are well known articles of commerce and are conventionally prepared by reacting polyesters with organic polyisocyanates in the presence of controlled amounts of water. Typical of such foams are those prepared from (a) polyesters derived, for instance, from the interaction of a glycol, such as diethylene glycol, and adipic acid or other dicarboxylic acid, sometimes in the presence of a low molecular weight cross-linking polyol containing at least 3 hydroxy groups, such as glycerol or trimethylol propane, (b) a polyisocyanate, usually a diisocyanate, such as tolylene diisocyanate, and (c) a small amount of water, the reaction being carried out in the presence of coupling agents or emulsifiers and catalysts.

In U.S. Pat. No. 3,079,350, granted Feb. 26, 1963, to C. Bernstein, there is disclosed improvements in flexible polyurethane foams wherein polyester resins derived from mixed glycols provide highly hydrophilic foams. Such flexible urethane foams generally require a high degree of cross-linking to increase the polyester viscosity to the range necessary for providing the desired foam quality but at the expense of reducing the stress-strain properties. This patent is incorporated herein by reference.

In U.S. Pat. No. 3,298,974, granted Jan. 17, 1967, and U.S. Pat. No. 3,399,154, granted Aug. 27, 1968, to C. Bernstein, et al., there is disclosed the manufacture of rigid (i.e., not flexible) polyurethanes wherein 0 to 100% of the total dicarboxylic acid in the polyester can be replaced with phthalic anhydride.

In U.S. Pat. No. 3,769,245, granted Oct. 30, 1973, to Stewart, et al., there is disclosed the formulation of thermoplastic linear polyurethanes wherein linear hydroxyl terminated polymers, such as polyalkylene oxides, are added as part of the prepolymer.

While such prior art polyurethanes were generally useful for their specific purposes, it was desired to provide flexible polyester polyurethane foams which would be readily processable and yet exhibit improved cell structure and physical properties over the prior art polyurethanes.

It is therefore an object of the present invention to provide improved flexible polyester polyurethane foams and improved polyester resins for making same.

It is a further object of the present invention to provide non-hydrophilic polyester polyurethane foams.

It is another object of the present invention to provide polyester polyurethane foams over a wide range of densities.

It is still a further object of the present invention to provide a flexible polyurethane foam having improved stress-strain properties, good machine processing character, cellular control, structure and integrity.

BRIEF SUMMARY OF THE INVENTION

The present invention provides an improved polyester resin wherein specific small quantities of cross-linking polyol are employed with small amounts of viscosity increasing diacid such as phthalic acid (anhydride), and small amounts of a poly(oxyethylene) glycol, to impart improved processing character to the resin and improved physical properties in the polyurethane foam produced therefrom. Specifically, the present polyester polyurethane foams show improved stress-strain properties and machinability, as well as being non-hydrophilic.

DESCRIPTION OF THE PREFERRED EMBODIMENTS

The present invention comprises a polyester polyurethane composition for producing flexible polyester polyurethane foams, which comprises a predominantly diethylene glycol polyester formulation, including, in 100 parts by weight of formulation, about 0.2–5.5 parts of a cross-linking polyol, about 1–12 parts by weight of a viscosity increasing diacid which replaces the diacid of the known polyester formulation, and about 1–15 parts of poly(oxyethylene) glycol, whereby the formulation remains liquid at 70° F. and has a viscosity between 18,000 to 30,000 cps, and preferably 22,000 to 25,000 cps. The present viscosity increasing diacid (anhydride) such as phthalic, terephthalic, isophthalic acid, fumaric acid, maleic acid and cycloaliphatic dicarboxylic acids such as cyclohexanedicarboxylic acid are well known in the art and require no further discussion herein. Phthalic acid is the preferred acid in the present resin.

A general formulation in parts by weight according to present invention is as follows:

|  | General Range | Preferred Range |
| --- | --- | --- |
| Diethylene Glycol | 30–50 | 35–45 |
| Aliphatic Dicarboxylic Acid | 40–60 | 42–50 |
| Viscosity Increasing Diacid | 1–12 | 6–9 |
| Poly(oxyethylene) Glycol | 1–15 | 2–8 |
| Cross-Linking Polyol | 0.2–5.5 | 1–4.5 |

In another aspect, the present invention is a flexible polyester polyurethane foam produced from the aforesaid polyester resin formulation, wherein the foamed product exhibits improved tensile strength, elongation and tear strength (i.e. stress-strain properties) because of the lesser quantities of cross-linking polyol used in the resin.

In the production of the polyester compositions of the present invention to produce novel flexible polyurethane foams, the diethylene glycol, the poly(oxyethylene) glycols and cross linking polyols are reacted with the mixture of the original dicarboxylic acid and the viscosity increasing dicarboxylic acid, (conveniently added as the anhydride) to form corresponding mixed esters as known in the art.

It is believed that the increased viscosity by the limited concentration of the phthalic acid, for instance, which replaces part of the original dicarboxylic acid such as adipic acid, combined with the reduced branching by the limited addition of the low molecular weight cross-linking polyols, provides a formulation which surprisingly achieves a foamed product of improved physical properties. The machine processing and general foam quality are substantially improved because of the presence of poly(oxyethylene) glycol.

The diethylene glycol may be mixed with small quantities of other low molecular weight between (62–150) glycols in the present composition such as propylene glycol-1,2; propylene glycol-1,3; butylene glycol-1,4; butylene glycol-1,3; butylene glycol-2,3; dipropylene glycol, and the like, for instance. However, diethylene glycol must be present in predominant amounts in the glycol mixture to arrive at the present resin product.

Among the dicarboxylic acids, which are partially replaced with a viscosity increasing diacid, utilized in making foamed polyesters of the prior art, are primary adipic acid or glutaric acid, and azelaic acid, sebacic acid, and malonic acid, succinic acid, pimelic acid, suberic acid, and the like. Adipic acid is widely used. Although the art teaches mixtures of these acids, there is no suggestion of the present specific mixture as claimed.

The poly(oxyethylene) glycols useful in the present invention are essentially linear hydroxy terminated compounds having ether linkages. These poly(oxyethylene) glycols generally have an average molecular weight between about 200 to 1,000. Of particular utility are those poly(oxyethylene) glycols having an average molecular weight of 300 to 800 and especially about 400. Typical illustrations of such poly(oxyethylene) glycols are those sold under the trade name Carbowax, of Union Carbide Co., New York, N.Y. Mixtures of two or more of said poly(oxyethylene) glycols can be used with good results, as well as mixtures with small amounts of higher poly(oxyalkylene) glycols such as polyoxypropylene glycol and partial copolymers wherein the poly(oxyethylene) glycol is in the predominant amount. Although the poly(oxyethylene) glycol may be present in an amount of about 2 to 8 percent, by weight, in the present resin, surprisingly, as little as 1% by weight is often effective to improve machine processing and produce the high quality flexible foam of the present invention, and 2 or 3 weight percent is often sufficient. The quantity of the other glycols in the mixture is determined by the Artisan, to yield a composition which is liquid at 70° F.

The cross-linking polyol is also added to the formulation in small quantities with further improvement in the physical properties of the foam product. Such cross-linking polyols include glycerol, trimethylol propane, sorbitol, pentaerythratol and the like, as known in the art.

The organic diisocyantes, the tertiary amine catalysts, the emulsifying agents, the proportions thereof, the proportions of water, and the procedural techniques involved in the production of the polyester polyurethane foams from the novel polyester compositions are also well known in the art.

As to the organic diisocyanates, tolylene diisocyanate (in commercial form it is usually a mixture containing about 80% of the 2,4 isomer and 20% of the 2,6 isomer), is preferred, but others, as known in the art, may be employed.

The finished polyurethane foams of the invention are conveniently shaped in the form of conventional flexible bodies having a broad range of densities from about 2 to 6 lbs., for instance.

The following examples are illustrative of the preparation of polyester compositions in accordance with the invention and the production of polyurethane foams therefrom. It will be understood that said examples are not to be construed as limitative of the invention since various changes can readily be made in the light of the guiding principles and teachings provided herein:

| RESIN FORMULAS | No. 1 (lbs.) | No. 2 (lbs.) | No. 3 (lbs.) | No. 4 (lbs.) |
| --- | --- | --- | --- | --- |
| Diethylene Glycol | 487 | 469 | 492 | 474 |
| Glycerol | 21 | 21 | 16 | 16 |
| Polyoxyethylene Glycol 400 | — | 29 | — | 28 |
| Adipic Acid | 653 | 638 | 579 | 560 |
| Phthalic Anhydride | — | — | 65 | 71 |
| Yield | 1,000 | 1,000 | 1,000 | 1,000 |

| FOAMING FORMULATIONS[1] | Parts by weight (lb.) |
| --- | --- |
| Resin | 100.0 |
| Water | 3.8 |
| N—Ethyl Morpholine | 1.6 |
| Coupler[4] | 1.2 |
| N—Coco Morpholin | 1.0 |
| Cetyl dimethyl amine | $0.25^2$–$0.31^3$ (lb/hr.) |
| Toluene Diisocyanate (80/20) Index 112 | |

[1] Same for Nos. 1–4
[2] Same for Nos. 2 and 4
[3] Same for Nos. 1 and 3
[4] Surfactant ester of ethyloxalated sorbitol oleic acid

| MACHINE PROCESSING & FOAM QUALITY | |
| --- | --- |
| No. 1 | Good machine processing; good cell structure. Some slight pour pattern striations. Medium cell size. |
| No. 2 | Good machine processing. Good uniform cell structure, very slight pour pattern striations. Medium cell size. |
| No. 3 | Poor machine processing; very irregular cell structure, heavy pour pattern striations. |
| No. 4 | Good machine processing. Good uniform cell structure, very slight pour pattern striations. Medium cell size. |

| FOAM PROPERTIES | No. 1 | No. 2 | No. 3 | No. 4 |
| --- | --- | --- | --- | --- |
| Density (lb/cu. ft.) | 1.85 | 1.80 | 1.78 | 1.84 |
| ILD-4"-25% | 61 | 63 | 58 | 59 |
| 50% | 85 | 88 | 78 | 83 |
| 65% | 114 | 116 | 106 | 110 |
| Tensile, PSI | 17 | 16 | 20 | 22 |
| Elongation % | 150 | 128 | 170 | 178 |
| Tear | 2.30 | 1.87 | 2.40 | 2.50 |
| 50% Compression Sets | 9 | 9 | 9 | 11 |
| 50% Autoclave Sets 3 hrs. @220° F. | 17 | 17 | 28 | 15 |
| Diecuttability | Good | Good | Good | Good |

Obviously, other modifications and variations of the present invention are possible in the light of the above teachings. It is, therefore, to be understood that changes may be made in the particular embodiments of the invention described which are within the full intended scope of the invention as defined by the appended claims.

The embodiments of the invention in which an exclusive property or privilege is claimed are defined as follows:

1. A flexible polyester foam produced from a polyester, liquid at 70° F., comprising the reaction product of a diacid, diethylene glycol, a viscosity increasing diacid replacing some of said diacid, and a poly(oxyethylene) glycol, wherein the resulting resin formulation of 100 parts by weight contains about 1–12 parts by weight of the viscosity increasing diacid, about 1–15 parts by weight of the poly(oxyethylene) glycol and about 0.2–5.5 parts of a cross-linking polyol.

2. The polyurethane foam of claim 1 wherein said diacid is adipic acid, and said viscosity increasing acid is phthalic acid.

3. A flexible polyester polyurethane foam produced from the resin formulation of claim 2.

4. The polyurethane foam of claim 3, wherein the polyoxyethylene glycol is present in about 2 to 8 percent by weight and the phthalic acid is present in about 6.0 to 9.0 percent by weight.

5. The polyurethane foam of claim 4, wherein the polyoxyethylene glycol is present in about 2 to 3 percent by weight.

* * * * *